(12) United States Patent
Li

(10) Patent No.: US 9,994,090 B2
(45) Date of Patent: Jun. 12, 2018

(54) SUN SHADING DEVICE, SUN SHADING METHOD AND TRANSPORTATION VEHICLE

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 56 days.

(21) Appl. No.: 15/107,580

(22) PCT Filed: Jan. 14, 2016

(86) PCT No.: PCT/CN2016/070856
§ 371 (c)(1),
(2) Date: Jun. 23, 2016

(87) PCT Pub. No.: WO2017/031932
PCT Pub. Date: Mar. 2, 2017

(65) Prior Publication Data
US 2017/0197494 A1 Jul. 13, 2017

(30) Foreign Application Priority Data

Aug. 21, 2015 (CN) .......................... 2015 1 0521096

(51) Int. Cl.
*B60J 3/04* (2006.01)
*G06F 3/041* (2006.01)
*G06K 9/00* (2006.01)

(52) U.S. Cl.
CPC ................ *B60J 3/04* (2013.01); *G06F 3/041* (2013.01); *G06K 9/00087* (2013.01)

(58) Field of Classification Search
CPC .............................. B60J 3/04; G06K 9/00087
See application file for complete search history.

(56) References Cited

U.S. PATENT DOCUMENTS 6,106,048 A * 8/2000 Wright ................... B60J 3/0208
296/97.13
6,328,371 B1 * 12/2001 Mac ....................... B60J 3/0208
296/97.13
(Continued)

FOREIGN PATENT DOCUMENTS

CN 202923351 U 5/2013
CN 104512221 A 4/2015
(Continued)

OTHER PUBLICATIONS

First Office Action dated Aug. 1, 2017 in corresponding Chinese Patent Application No. 201510521096.0.
(Continued)

*Primary Examiner* — Jason S Morrow
*Assistant Examiner* — E Turner Hicks
(74) *Attorney, Agent, or Firm* — Nath, Goldberg & Meyer; Joshua B. Goldberg

(57) ABSTRACT

The present invention discloses a sun shading device, a sun shading method and a transportation vehicle. The sun shading device comprises a support and a light adjusting device provided on the support, the light adjusting device at least partially blocks external light by adjusting its light transmission rate. In the technical solutions of the sun shading device, the sun shading method based on the sun shading device, and the transportation vehicle comprising the sun shading device provided in the present invention, the sun shading device may not only block light, but also avoid blocking a user's view.

16 Claims, 3 Drawing Sheets

(56) References Cited

U.S. PATENT DOCUMENTS

| 2009/0058126 | A1 | | 3/2009 | Broude et al. |
| 2011/0163866 | A1 | | 7/2011 | Ghannam et al. |
| 2014/0055831 | A1 | * | 2/2014 | Johnson .................... E06B 9/24 |
| | | | | 359/238 |
| 2015/0097389 | A1 | * | 4/2015 | Dryselius ................... B60J 3/04 |
| | | | | 296/96.19 |
| 2016/0318379 | A1 | * | 11/2016 | Okuda ....................... B60J 3/04 |
| 2017/0013188 | A1 | * | 1/2017 | Kothari ............... B60R 11/0235 |

FOREIGN PATENT DOCUMENTS

| CN | 204526751 U | 8/2015 |
| CN | 105183218 A | 12/2015 |
| CN | 204856437 U | 12/2015 |

OTHER PUBLICATIONS

International Search Report dated Apr. 27, 2016 issued in corresponding International Application No. PCT/CN2016/070856 along with an English translation of the Written Opinion of the International Searching Authority.

* cited by examiner

SUN SHADING DEVICE, SUN SHADING METHOD AND TRANSPORTATION VEHICLE

This is a National Phase Application filed under 35 U.S.C. 371 as a national stage of PCT/CN2016/070856, filed Jan. 14, 2016, an application claiming the benefit of Chinese Application No. 201510521096.0, filed on Aug. 21, 2015, the content of each of which is hereby incorporated by reference in its entirety.

FIELD OF THE INVENTION

The present invention relates to the field of sun shading technology, and particularly relates to a sun shading device, a sun shading method and a transportation vehicle.

BACKGROUND OF THE INVENTION

When a user drives a car, a sun visor is usually used as a sun shading device. When the car is exposed to direct radiation of the sunlight continuously, the sun visor is generally configured to blocking the light so as to guarantee driving safety of the user.

In the prior art, the sun visor is an opaque plate, and the light may be blocked completely by placing the sun visor above the user in the car.

However, because the sun visor is opaque, it not only blocks the light completely, but also blocks a part of a view of the user, thereby influencing the driving safety.

SUMMARY OF THE INVENTION

The present invention provides a sun shading device, a sun shading method and a transportation vehicle for improving driving safety.

Embodiments of the present invention provide a sun shading device, comprising a support and a light adjusting device provided on the support, wherein the light adjusting device at least partially blocks external light by adjusting its light transmission rate.

The support may fix the light adjusting device and drive the light adjusting device to rotate to a preset angle.

The light adjusting device may be a transparent touch display device which may comprise a touch area.

When a user's finger slides along a first direction in the touch area, the light adjusting device may adjust, according to a sliding length along the first direction, the light transmission rate to a light transmission rate corresponding to said sliding length.

When a user's finger touches the touch area, the light adjusting device may identify the finger which performs the touch operation, and adjust, according to the finger which performs the touch operation, the light transmission rate to a light transmission rate corresponding to the finger which performs the touch operation.

When a user's finger slides along a second direction in the touch area, the light adjusting device may divide a screen of the transparent touch display device into a first sub-area and a second sub-area according to a preset area-division light-transmission mode, and the light transmission rate of the first sub-area is different from that of the second sub-area.

A ratio of a length of the first sub-area to that of the second sub-area in the second direction may correspond to a sliding length along the second direction.

The first sub-area and the second sub-area may be obtained by division made perpendicular to the second direction, the first sub-area may be located at the top, and the second sub-area may be located at the bottom.

When a user's finger slides along the first direction in the touch area corresponding to the first sub-area, the light transmission rate of the first sub-area may be adjusted, according to a sliding length along the first direction, to a light transmission rate corresponding to said sliding length. When a user's finger slides along the first direction in the touch area corresponding to the second sub-area, the light transmission rate of the second sub-area may be adjusted, according to the sliding length along the first direction, to a light transmission rate corresponding to said sliding length.

Before adjusting its light transmission rate, the light adjusting device may also authenticate the user based on a fingerprint of the user's finger.

The light adjusting device may include any one of the following transparent touch display devices having adjustable light transmission rates: a polymer dispersed liquid crystal display device, an electrochromic device display device, an organic light-emitting diode display device, an E-paper display device and a liquid crystal display.

The embodiments of the present invention further provide a transportation vehicle, comprising the aforesaid sun shading device.

The transportation vehicle may further comprise a control device which is connected with the light adjusting device and is located in an operating area of user, wherein the control device sends an operation instruction to the light adjusting device when the user performs an operation, so as to operate the light adjusting device.

The control device may comprise a key, and the control device may send an operation instruction corresponding to the key to the light adjusting device when the user presses the key, so as to operate the light adjusting device.

The operating area of user may be located in a steering wheel.

The embodiments of the present invention further provide a sun shading method based on a sun shading device, the sun shading device comprises a support and a light adjusting device provided on the support, and the sun shading method comprises at least partially blocking external light by adjusting a light transmission rate of the light adjusting device.

The light adjusting device may be a transparent touch display device which may comprise a touch area.

When a user's finger slides along a first direction in the touch area, the light transmission rate may be adjusted, according to a sliding length along the first direction, to a light transmission rate corresponding to said sliding length.

When a user's finger touches the touch area, the finger which performs the touch operation may be identified, and the light transmission rate may be adjusted, according to the finger which performs the touch operation, to a light transmission rate corresponding to the finger which performs the touch operation.

When a user's finger slides along a second direction in the touch area, a screen of the transparent touch display device may be divided into a first sub-area and a second sub-area according to a preset area-division light-transmission mode, and a light transmission rate of the first sub-area is different from that of the second sub-area.

In the technical solutions of the sun shading device, the sun shading method and the transportation vehicle provided in the embodiments of the present invention, the sun shading device comprises the support and the light adjusting device provided on the support, and the light adjusting device may at least partially block external light by adjusting its light transmission rate. The sun shading device according to the embodiments of the present invention may not only block light, but also avoid blocking a user's view, so as to enable a user to see a road ahead clearly, thereby improving driving safety.

DETAILED DESCRIPTION OF THE EMBODIMENTS

In order to make those skilled in the art better understand the technical solutions of the present invention, a sun shading device, a sun shading method and a transportation vehicle provided by the present invention will be further described in detail below with reference to the accompanying drawings.

Figure 1:
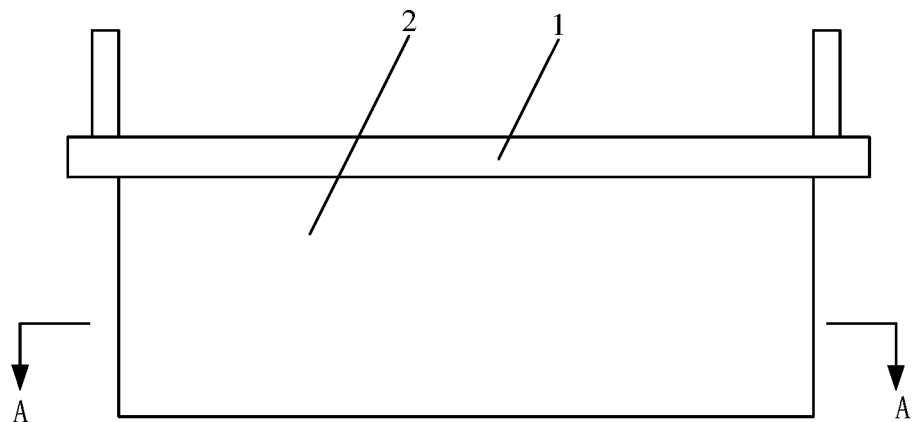
FIG. 1 is a structural schematic diagram of a sun shading device according to embodiments of the present invention.

FIG. 1 is a structural schematic diagram of a sun shading device according to embodiments of the present invention. As shown in FIG. 1, the sun shading device comprises a support 1 and a light adjusting device 2. The light adjusting device 2 is provided on the support 1. The light adjusting device 2 is configured to at least partially block external light by adjusting its light transmission rate.

In this embodiment, the light adjusting device 2 may adjust its light transmission rate to control an amount of transmission of the external light, so as to partially block the external light. Alternatively, the light adjusting device 2 may adjust its light transmission rate according to actual needs to prevent transmission of the external light, so as to completely block the external light. The sun shading device according to the embodiments of the present invention may not only block light, but also avoid blocking a user's view, so as to enable a user to see a road ahead clearly, thereby improving driving safety.

The support 1 is configured to fix the light adjusting device 2 and to drive the light adjusting device 2 to rotate to a preset angle. When the sun shading device is applied in a car, the light adjusting device 2 is fixed to the support, and the support 1 is fixed to a car roof ahead of the user, so as to fix the light adjusting device 2 to the car roof ahead of the user. When there is a need to adjust an angle of the light adjusting device 2, the support 1 may be rotated to drive the light adjusting device 2 to rotate to the preset angle. The rotatable support may make it easy to adjust a placement angle of the light adjusting device, and also facilitate operation of the user.

The light adjusting device may be a transparent touch display device. In this embodiment, the light adjusting device may include any one of the following transparent touch display devices having adjustable light transmission rates: a liquid crystal display (LCD), an organic light-emitting diode (OLED) display device, an electrochromic device (ECD) display device, a polymer dispersed liquid crystal (PDLC) display device and an E-paper display device. In the light adjusting devices listed above, the PDLC display device, the ECD display device and the OLED display device have relatively high light transmission rates. In some embodiments, for example, the light adjusting device may be a PDLC display device, an ECD display device or an OLED display device, so that the light transmission rate of the light adjusting device may be adjusted to a high one. The transparent touch display device may comprise a touch area to which a touch operation is performed so as to adjust a light transmission rate of the transparent touch display device.

Figure 2:
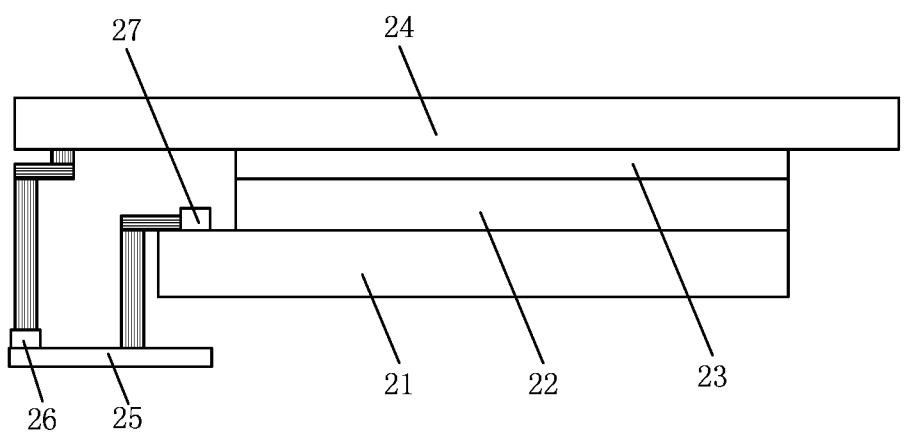
FIG. 2 is a cross-sectional view taken along Direction A-A of FIG. 1.

FIG. 2 is a cross-sectional view taken along Direction A-A of FIG. 1. As shown in FIGS. 1 and 2, the light adjusting device 2 may comprise an upper substrate 21, a lower substrate 22, a bonding layer 23, a cover lens 24, a system board 25, a touch sensor 26 and a driving chip 27. The upper substrate 21 and the lower substrate 22 are provided opposite to each other, the cover lens 24 is bonded to the lower substrate 22 through the bonding layer 23, the driving chip 27 is provided on the upper substrate 21 and is connected with the system board 25, and the touch sensor 26 is respectively connected with the cover lens 24 and the system board 25. For example, the upper substrate 21 is an array substrate, and the lower substrate 22 is a color filter substrate. A touch function of the light adjusting device 2 may be fulfilled by adopting different types of touch technologies, such as infrared touch technology or capacitive touch technology. In the case that the touch function of the light adjusting device 2 is fulfilled by adopting the capacitive touch technology, a touch signal line may be integrated with the cover lens 24. The driving chip 27 may achieve display drive and touch drive of the light adjusting device 2. The specific structure of the sun shading device shown in FIG. 2 is merely an example, and other structures may be adopted in practical application, and will not be listed herein one by one.

In the embodiments of the present invention, when a user's finger slides along a first direction in the touch area, the light adjusting device 2 may adjust, according to a sliding length along the first direction, the light transmission rate to a light transmission rate corresponding to said sliding length. In this embodiment, a corresponding relation between a sliding length and a light transmission rate may be preset in advance. For example, the first direction is a horizontal direction which may be one from left to right or one from right to left, and a horizontal direction from left to right is taken as an example in FIGS. 3a and 3b.

Figure 3A:
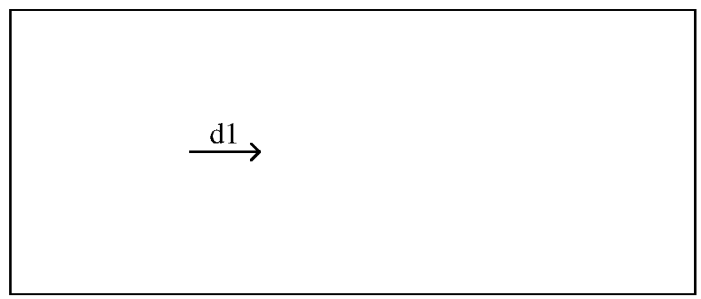
FIG. 3a is a schematic diagram of one application of adjusting a light transmission rate by a light adjusting device in the embodiments of the present invention.

FIG. 3a is a schematic diagram of one application of adjusting a light transmission rate by the light adjusting device in the embodiments of the present invention. As shown in FIG. 3a, a user's finger slides horizontally from left to right by a sliding length d1 in the touch area of a screen of the light adjusting device 2, and a light transmission rate corresponding to the sliding length d1 is 25%.

Figure 3B:
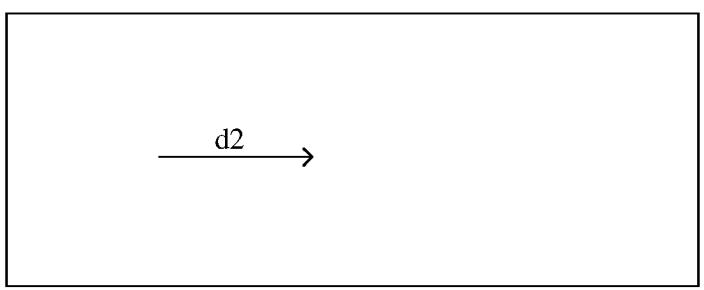
FIG. 3b is a schematic diagram of another application of adjusting a light transmission rate by a light adjusting device in the embodiments of the present invention.

FIG. 3b is a schematic diagram of another application of adjusting a light transmission rate by the light adjusting device in the embodiments of the present invention. As shown in FIG. 3b, a user's finger slides horizontally from left to right by a sliding length d2 in the touch area of the screen of the light adjusting device 2, and a light transmission rate corresponding to the sliding length d2 is 50%.

The user may perform an operation of the above horizontal slide with one or more fingers. The adjustment method, in which the light transmission rate is adjusted by sliding along the first direction, is simple and is easy to perform.

It should be noted that this embodiment takes a horizontal direction as an example of the first direction for illustration, but does not make a limitation on the first direction, and a vertical direction or another direction may be set as the first direction according to design needs or needs of user experience.

In the embodiments of the present invention, when a user's finger touches the touch area, the light adjusting device 2 may identify the finger which performs the touch operation, and adjust, according to the finger which performs the touch operation, the light transmission rate to a light transmission rate corresponding to the finger which performs the touch operation. In this embodiment, a corresponding relation between a finger and a light transmission rate may be preset in advance. For example, a light transmission rate corresponding to a thumb is 80%, a light transmission rate corresponding to an index finger is 65%, a light transmission rate corresponding to a middle finger is 50%, a light transmission rate corresponding to a ring finger is 25%, and a light transmission rate corresponding to a little finger is 5%. For example, when a user's index finger touches the touch area, the light adjusting device 2 identifies the finger which performs the touch operation as an index finger, and adjusts the light transmission rate to a light transmission rate of 65% corresponding to the index finger. In this technical solution, the finger which performs the touch operation may be identified with a technical solution described below in FIG. 5, which will not be repeated here. The adjustment method, in which a light transmission rate is adjusted by a touch operation of a finger, is rapid and simple, and is easy to perform.

In the embodiments of the present invention, when a user's finger slides along a second direction in the touch area, the light adjusting device 2 may divide the screen of the transparent touch display device into a first sub-area and a second sub-area according to a preset area-division light-transmission mode, and a light transmission rate of the first sub-area is different from that of the second sub-area. The preset area-division light-transmission mode comprises dividing the touch area of the screen into the first sub-area and the second sub-area. For example, the second direction is a vertical direction which may be one from top to bottom or one from bottom to top, and a vertical direction from top to bottom is taken as an example in FIG. 4.

Figure 4:
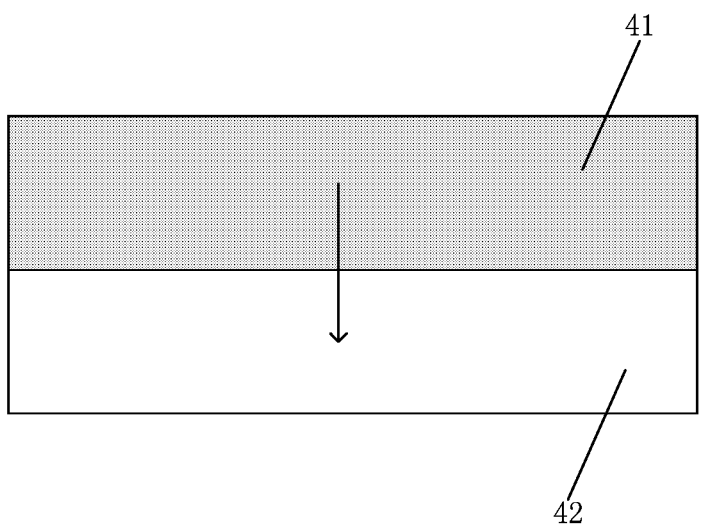
FIG. 4 is a schematic diagram of adjusting sub-areas by a light adjusting device in the embodiments of the present invention.

FIG. 4 is a schematic diagram of adjusting sub-areas by the light adjusting device in the embodiments of the present invention. As shown in FIG. 4, a user's finger slides vertically from top to bottom in the touch area of the screen of the light adjusting device 2, the light adjusting device 2 starts the area-division light-transmission mode and divides the screen into a first sub-area 41 at the top and a second sub-area 42 at the bottom, and the light transmission rate of the first sub-area 41 is different from that of the second sub-area 42. For example, the light transmission rate of the first sub-area 41 is 25%, and the light transmission rate of the second sub-area 42 is 80%. The adjustment method, in which area-division light-transmission is set by sliding along the second direction, is simple and is easy to perform.

It should be noted that this embodiment takes a vertical direction as an example of the second direction for illustration, but does not make a limitation on the second direction, and a horizontal direction may be set as the second direction according to design needs or needs of user experience, and in such case, the screen is divided into a first sub-area on a left side and a second sub-area on a right side. Of course, another direction may be set as the second direction. In addition, sliding along the first direction may be used for adjusting the light transmission rate to a light transmission rate corresponding to a sliding length along said direction, and sliding along the second direction may be configured to dividing the screen into sub-areas having different light transmission rates, and the first direction may be identical to or different from the second direction.

For example, the first sub-area 41 and the second sub-area 42 are obtained by division made perpendicular to the second direction, the first sub-area 41 is located at the top, and the second sub-area 42 is located at the bottom. For example, the light transmission rate of the first sub-area 41 is smaller than that of the second sub-area 42. Since the light transmission rate of the first sub-area 41 located at the top is smaller than that of the second sub-area 42 located at the bottom, the user may be shaded from sunlight by the first sub-area 41 having the smaller light transmission rate, and see a road ahead clearly through the second sub-area 42 having the larger light transmission rate.

For example, a ratio of a length of the first sub-area to that of the second sub-area in the second direction may correspond to a sliding length along the second direction. In such case, the touch area of the screen is divided into the first sub-area and the second sub-area according to the sliding length along the second direction in the preset area-division light-transmission mode. Taking a vertical direction as an example of the second direction, the vertical direction may be one from top to bottom or one from bottom to top, and a vertical direction from top to bottom is taken as an example in FIG. 4. As shown in FIG. 4, when a user's finger slides vertically from top to bottom in the touch area of the screen of the light adjusting device 2, the light adjusting device 2 starts the area-division light-transmission mode and divides the screen into the first sub-area 41 and the second sub-area 42, and the ratio of the length of the first sub-area 41 to that of the second sub-area 42 in the second direction corresponds to the sliding length along the second direction. For example, when the sliding length along the second direction is L1, the ratio of the length of the first sub-area 41 to that of the second sub-area 42 in the second direction is 1:1; and when the sliding length along the second direction is L2, the ratio of the length of the first sub-area 41 to that of the second sub-area 42 in the second direction is 2:1. The light transmission rate of the first sub-area 41 is different from that of the second sub-area 42. For example, the light transmission rate of the first sub-area 41 is 25%, and the light transmission rate of the second sub-area 42 is 80%. In such case, the user may adjust the ratio of the length of the first sub-area 41 to that of the second sub-area 42 in the second direction according to actual radiation of external light. The adjustment method is flexible and simple, thereby achieving better blocking of sunlight and enabling the user to see the road ahead clearly.

In addition, the user may adjust a light transmission rate of each sub-area independently in need of changing the light transmission rate of each sub-area. For example, when a user's finger slides along the first direction in the touch area corresponding to the first sub-area 41, the light transmission rate of the first sub-area 41 may be adjusted, according to a sliding length along the first direction, to a light transmission rate corresponding to said sliding length. In addition, when a user's finger slides along the first direction in the touch area corresponding to the second sub-area 42, the light transmission rate of the second sub-area 42 may be adjusted, according to the sliding length along the first direction, to a light transmission rate corresponding to said sliding length. The first direction may be a horizontal direction, for example, a horizontal direction from left to right.

In the embodiments of the present invention, before adjusting its light transmission rate, the light adjusting device 2 may authenticate the user based on a fingerprint of a user's finger. Description is given below by taking the light adjusting device of FIG. 2 as an example, and the light adjusting device of FIG. 2 adopts capacitive touch technology.

Figure 5:
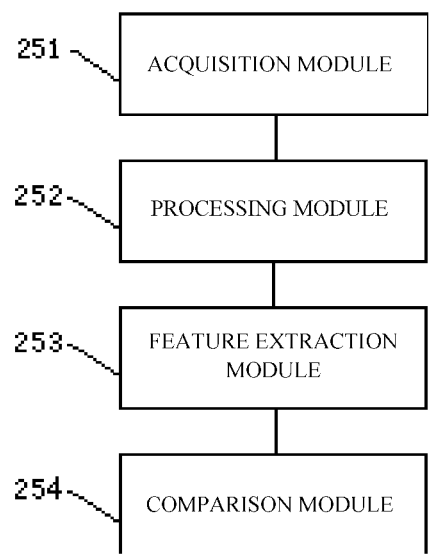
FIG. 5 is a structural schematic diagram of a fingerprint identification system in the embodiments of the present invention.

FIG. 5 is a structural schematic diagram of a fingerprint identification system in the embodiments of the present invention. As shown in FIG. 5, the light adjusting device further comprises a fingerprint identification system which may include an acquisition module 251, a processing module 252, a feature extraction module 253 and a comparison module 254. The user performs a touch operation by a means such as scratching or pressing on the screen. The touch sensor 26 obtains coordinates of a touch position by sensing a change in capacitance of the touch position.

The acquisition module 251 may collect a fingerprint of a finger and generate a fingerprint image. Specifically, the acquisition module 251 may collect the fingerprint by an optical means, an ultrasonic means or a capacitive means. The acquisition module 251 may be a fingerprint collector.

Figure 6:
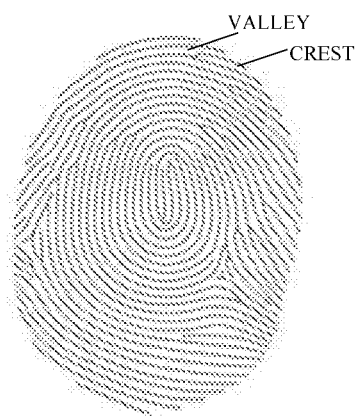
FIG. 6 is a schematic diagram of a fingerprint image in the embodiments of the present invention.

FIG. 6 is a schematic diagram of a fingerprint image in the embodiments of the present invention. As shown in FIG. 6, the fingerprint image is a pattern of unevenly distributed fingerprints, and the pattern includes crests and valleys, and fingerprints may be classified into loops, arches and whorls.

The processing module 252 performs extremum filtering and sharpening on the fingerprint image generated by the acquisition module 251, sets a gray value of each pixel point in the fingerprint image, which has been subject to extremum filtering and sharpening, to 0 or 255, binarizes the fingerprint image which has been subject to gray value setting, and performs thinning to the binarized fingerprint image to obtain a preprocessed fingerprint image.

The feature extraction module 253 extracts information of feature points of fingerprint from the preprocessed fingerprint image. The feature points may include a starting point, a termination, a crossing point, a bifurcation, an endpoint, an isolated point, a short branch and/or a loop, etc. The information of the feature points may include types, coordinates and/or directions and other parameters. The endpoint and the bifurcation are most likely appear in the fingerprint, are most stable and are most easy to be collected.

The comparison module 254 compares the extracted information of the feature points with a pre-stored fingerprint database, and identifies the finger corresponding to the information of the feature points if the information of the feature points matches the fingerprint database. Specifically, the comparison module 254 may judge whether the information of the feature points matches the fingerprint database by calculating a similarity degree between the information of the feature points and the fingerprint database, so as to identify fingers of different users or different fingers of the same user.

The aforesaid fingerprint identification system may be independently provided, or integrated into the system board 25. Before adjusting its light transmission rate, the light adjusting device 2 authenticates the user based on the fingerprint of the user's finger, thereby effectively guaranteeing operation safety.

The sun shading device according to the embodiments of the present invention comprises the support and the light adjusting device provided on the support, and the light adjusting device may at least partially block external light by adjusting its light transmission rate. The sun shading device according to the embodiments of the present invention may not only block light, but also avoid blocking a user's view, so as to enable a user to see a road ahead clearly, thereby improving driving safety.

The embodiments of the present invention further provide a transportation vehicle, comprising the aforesaid sun shading device, the description of which will not be repeated herein.

In this embodiment, the transportation vehicle may be a car, a train or a ship, or any other tool having a transportation function.

Furthermore, the transportation vehicle further comprises a control device which is connected with the light adjusting device and is located in an operating area of user. The control device is configured to send an operation instruction to the light adjusting device when the user performs an operation, so as to operate the light adjusting device.

For example, the operating area of user is located in a steering wheel. In practical application, the operating area of user may be other areas inside the car as long as it is convenient for the user to perform operations in said areas in a driving process.

In this embodiment, the operation instruction may include a slide touch instruction for light transmission rate adjustment, a finger touch instruction for light transmission rate adjustment or a slide instruction for area division. When the user performs a slide operation on the control device, the operation instruction is the slide touch instruction for light transmission rate adjustment, and after receiving the instruction for light transmission rate adjustment, the light adjusting device adjusts the light transmission rate to a light transmission rate corresponding to a sliding length according to the instruction for light transmission rate adjustment. When the user performs a finger touch operation on the control device, the operation instruction is the finger touch instruction for light transmission rate adjustment, and after receiving the finger touch instruction for light transmission rate adjustment, the light adjusting device adjusts the light transmission rate to a light transmission rate corresponding to the finger which performs the touch operation according to the finger touch instruction for light transmission rate adjustment. When the user performs a slide operation on the control device, the operation instruction is the slide instruction for area division, and after receiving the slide instruction for area division, the light adjusting device divides a screen thereof into a first sub-area and a second sub-area according to the slide instruction for area division.

In addition, in the case where the control device comprises a key, the control device may send an operation instruction corresponding to the key to the light adjusting device when the user presses the key, so as to operate the light adjusting device. In such technical solution, a corresponding relation between a key and an operation instruction may be preset in advance. The number of the keys may be set as required, and thus may be one or more than one.

In the technical solution of the transportation vehicle provided in this embodiment, the sun shading device comprises the support and the light adjusting device provided on the support, and the light adjusting device may at least partially block external light by adjusting its light transmission rate. The sun shading device according to this embodiment may not only block light, but also avoid blocking the user's view, so as to enable the user to see a road ahead clearly, thereby improving driving safety. In this embodiment, the control device is provided in the operating area of user, and the light adjusting device is operated through the control device, so that it is not necessary for the user to directly operate on the light adjusting device, thereby further improving driving safety.

The embodiments of the present invention further provide a sun shading method based on a sun shading device. The sun shading device comprises a support and a light adjusting device provided on the support. The method comprises at least partially blocking external light by the light adjusting device adjusting its light transmission rate.

In this embodiment, the light adjusting device may be a transparent touch display device which may comprise a touch area. At least partially blocking external light by the light adjusting device adjusting its light transmission rate comprises at least one of following steps. When a user's finger slides along a first direction in the touch area, the light adjusting device adjusts, according to a sliding length along the first direction, the light transmission rate to a light transmission rate corresponding to said sliding length; or, when a user's finger touches the touch area, the light adjusting device identifies the finger which performs the touch operation, and adjusts, according to the finger which performs the touch operation, the light transmission rate to a light transmission rate corresponding to the finger which performs the touch operation; or, when a user's finger slides along a second direction in the touch area, the light adjusting device divides a screen of the transparent touch display device into a first sub-area and a second sub-area according to a preset area-division light-transmission mode, and a light transmission rate of the first sub-area is different from that of the second sub-area.

The sun shading method provided in this embodiment may be implemented by the sun shading device provided in the aforesaid embodiments, and description of the sun shading device may be found with reference to the aforesaid embodiments, and will not be repeated herein.

In the sun shading method provided in this embodiment, the sun shading device comprises the support and the light adjusting device provided on the support, and the light adjusting device may at least partially block external light by adjusting its light transmission rate. The sun shading device according to this embodiment may not only block light, but also avoid blocking the user's view, so as to enable the user to see a road ahead clearly, thereby improving driving safety.

It could be understood that the foregoing implementations are merely exemplary implementations adopted for describing the principle of the present invention, but the present invention is not limited thereto. Those of ordinary skill in the art may make various variations and improvements without departing from the spirit and essence of the present invention, and these variations and improvements shall be considered to fall within the protection scope of the present invention.

What is claimed is:

1. A sun shading device, comprising a support and a light adjusting device provided on the support, wherein
the light adjusting device at least partially blocks external light by adjusting its light transmission rate,
the light adjusting device is a transparent touch display device that comprises a touch area, and
when a user's finger touches the touch area to perform a touch operation, the light adjusting device identifies the finger which performs the touch operation, and adjusts, according to the finger which performs the touch operation, the light transmission rate to a light transmission rate corresponding to the finger which performs the touch operation.

2. The sun shading device of claim 1, wherein the support fixes the light adjusting device and drives the light adjusting device to rotate to a preset angle.

3. The sun shading device of claim 1, wherein
when a user's finger slides along a first direction in the touch area, the light adjusting device adjusts, according to a sliding length along the first direction, the light transmission rate to a light transmission rate corresponding to said sliding length.

4. The sun shading device of claim 1, wherein
when a user's finger slides along a second direction in the touch area, the light adjusting device divides a screen of the transparent touch display device into a first sub-area and a second sub-area according to a preset area-division light-transmission mode, and
the light transmission rate of the first sub-area is different from that of the second sub-area.

5. The sun shading device of claim 4, wherein a ratio of a length of the first sub-area to that of the second sub-area in the second direction corresponds to a sliding length along the second direction.

6. The sun shading device of claim 4, wherein the first sub-area and the second sub-area are obtained by division made perpendicular to the second direction, the first sub-area is located at the top, and the second sub-area is located at the bottom.

7. The sun shading device of claim 4, wherein
when the user's finger slides along the first direction in the touch area corresponding to the first sub-area, the light transmission rate of the first sub-area is adjusted to a light transmission rate corresponding to a sliding length along the first direction according to said sliding length; and
when a user's finger slides along the first direction in the touch area corresponding to the second sub-area, the light transmission rate of the second sub-area is adjusted to a light transmission rate corresponding to a sliding length along the first direction according to said sliding length.

8. The sun shading device of claim 1, wherein the light adjusting device authenticates the user based on a fingerprint of the user's finger before adjusting its light transmission rate.

9. The sun shading device of claim 1, wherein the light adjusting device includes any one of the following transparent touch display devices having adjustable light transmission rates: a polymer dispersed liquid crystal display device, an electrochromic display device, an organic light-emitting diode display device, an E-paper display device and a liquid crystal display.

10. A transportation vehicle, comprising the sun shading device of claim 1.

11. The transportation vehicle of claim 10, further comprising a control device that is connected with the light adjusting device and is located in an operating area of user, wherein
the control device sends an operation instruction to the light adjusting device when the user performs an operation, so as to operate the light adjusting device.

12. The transportation vehicle of claim 11, wherein the control device comprises a key, and when the user presses the key, the control device sends an operation instruction corresponding to the key to the light adjusting device, so as to operate the light adjusting device.

13. The transportation vehicle of claim 11, wherein the operating area of user is located in a steering wheel.

14. A sun shading method based on a sun shading device, the sun shading device comprising a support and a light adjusting device provided on the support, the sun shading method comprising:
    at least partially blocking external light by the light adjusting device adjusting its light transmission rate,
    the light adjusting device is a transparent touch display device that comprises a touch area, and
    at least partially blocking external light by the light adjusting device adjusting its light transmission rate comprises:
    when a user's finger touches the touch area to perform a touch operation, identifying the finger which performs the touch operation, and adjusting the light transmission rate to a light transmission rate corresponding to the finger which performs the touch operation according to the finger which performs the touch operation.

15. The sun shading method of claim 14, wherein at least partially blocking external light by the light adjusting device adjusting its light transmission rate comprises:
    when a user's finger slides along a first direction in the touch area, adjusting the light transmission rate to a light transmission rate corresponding to a sliding length along the first direction according to said sliding length.

16. The sun shading method of claim 14, wherein at least partially blocking external light by the light adjusting device adjusting its light transmission rate comprises:
    when a user's finger slides along a second direction in the touch area, dividing a screen of the transparent touch display device into a first sub-area and a second sub-area according to a preset area-division light-transmission mode, the light transmission rate of the first sub-area being different from that of the second sub-area.

* * * * *